Patented Dec. 5, 1922.

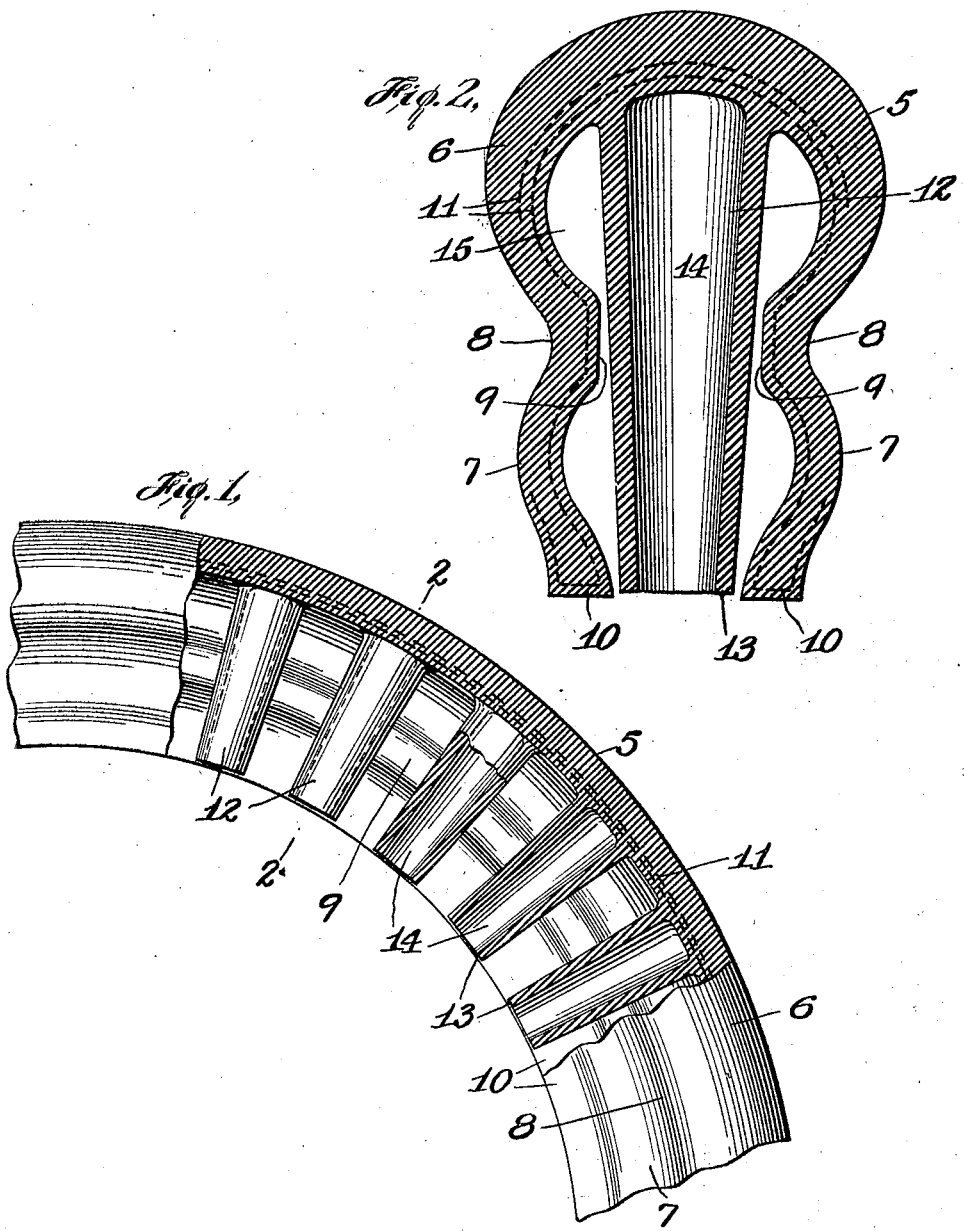

1,438,070

UNITED STATES PATENT OFFICE.

LOUIS TURAN, OF BROOKLYN, NEW YORK.

TIRE CONSTRUCTION.

Application filed June 15, 1922. Serial No. 568,397.

*To all whom it may concern:*

Be it known that I, LOUIS TURAN, a citizen of the United States, and residing at Brooklyn, in the county of Kings and State of New York, have invented certain new and useful Improvements in Tire Constructions, of which the following is a specification, such as will enable those skilled in the art to which it appertains to make and use the same.

This invention relates to tires and particularly to punctureproof tires or tires in which the usual inflatable tube is omitted, and the object of the invention is to provide a tire of the class specified which is so constructed as to be of sufficient strength or rigidity as to support the vehicle in connection with which the tire or tires are mounted and yet of sufficient resilient qualities so as to produce as near as possible the pneumatic qualities of a pneumatic tire or a tire employing a pneumatic tube; a further object of the invention being to provide means for reinforcing the central tread portion of the tire and to form of such means air cushioned members which aid in supporting the tire and which also provides semi-pneumatic members for the tire; and with these and other objects in view the invention consists in a tire of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side and sectional view of a part of my improved tire; and,

Fig. 2 a section on the line 2—2 of Fig. 1 and on an enlarged scale.

My improved tire 5 is substantially the shape of the numeral 8 in form in cross section or comprises a tread portion 6 which is approximately circular in form in cross section and extending from the edges of the tread portion 6 and at the opposite sides of the tire are members 7 which are substantially arc-shaped or semi-circular in form in cross section and where the members 7 join the tread member 6, the tire is contracted as shown at 8 and the inner face of the contracted portions 8 are straight or flat as shown at 9, and the free edges or side portions 10 of the members 7 in the construction shown are of such form in cross section as to be mounted in connection with a rim adapted to receive what is known as a straight side tire, but these edges may be made of the clincher type, if desired. The tire 5 and the various parts thereof are preferably reinforced by canvas, cord or other suitable material 11 in the usual or any desired manner.

The inner face of the tread portion 6 of the tire is provided with a plurality of inwardly directed tubular members 12 which are conical in form and which are spaced circumferentially of the inner face of the tread member 6 of the tire, as clearly shown in Fig. 1 of the drawing, and the inner ends 13 of said members extend to approximately the base or inner face of the tire, and are located between the edges 10 of the members 7 thereof as clearly shown in Fig. 2 of the drawing, and the walls of the tubular members 12 are preferably spaced from the straight inner faces 9 of the contracted portions 8 of the tire. The members 12 may be formed integrally with the tire or independent thereof and secured thereto by vulcanizing, or in any other desired manner. The members 12, as will be apparent, will form a number of air chambers 14 circumferentially of the tire and air under atmospheric pressure will normally be contained therein as well as within the space 15 around said members and within the tire.

The members 7 will be so constructed, as well as the tread portion 6 of the tire, to normally support the load of a vehicle in connection with which the tire is mounted, it being understood that the tire may deflate to a slight extent in accomplishing this result, and the tubular members 12 with the air chambers 14 formed therein will also operate to produce this result, it being understood that the pressure of the inner ends of the members 12 upon the rim for supporting the tire when the tire is deflated to a slight extent, will operate to seal the chambers 14 thus forming air cushions of the separate members 12 and sufficient clearance will be allowed normally between the ends of the members 12 and the rim to allow air to pass into and out of the chambers 14 in the operation or use of the tire.

In the event of any one of the members 12 being punctured, it will be understood that even though the puncture be comparatively large, the remaining members 12 will be sufficient to support the tire notwithstanding the fact that the portion of the tire provided with the puncture which opens into the said member 12 will deflate to a greater extent in passing over the ground than would be the case if the puncture did not exist. In the event of small punctures, the deflation of the tire will be greatly reduced as the air will have to be forced out of the compartment or chamber 14 through the puncture as that portion of the tire passes over the ground, and in view of the fact that this is only a momentary condition the existing deflation will not be objectionable.

A tire constructed along the lines of my improvement will render long and durable service, and the present inconvenience and disadvantage occasioned by the puncturing of pneumatic tires will be obviated. Another feature of my improved tire resides in the contracted portions 8 thereof and in the use of the tire the deflation of the tread portion will operate to move the contracted portions 8 inwardly toward each other, and in this operation the comparatively straight faces 9 will be brought into engagement with the walls of the members 12, which members have a tendency to expand in this operation, and this will operate to reinforce and strengthen the tire, or the tread portion thereof and aid in holding the same in an extended portion.

It will also be understood that while I have shown a tire of specific form and construction with specific form of cushion members 12 therein, that I am not necessarily limited to the construction herein shown and described, and various changes therein and modifications thereof may be made, within the scope of the appended claims, without departing from the spirit of my invention or sacrificing its advantages.

Having fully described my invention, what I claim as new and desire to secure by Letters Patent, is:—

1. A tire of the class described the inner face of the tread member of which is provided with a plurality of inwardly directed tubular members spaced circumferentially of the tire.

2. A tire of the class described the inner face of the tread member of which is provided with a plurality of inwardly directed tubular members spaced circumferentially of the tire, said members being adapted to receive air under atmospheric pressure and operating as a cushioned portion for the tire.

3. A tire of the class described the inner face of the tread member of which is provided with a plurality of inwardly directed tubular members spaced circumferentially of the tire, said members being adapted to receive air under atmospheric pressure and operating as a cushioned portion for the tire, the inner ends of said members terminating adjacent to the inner face of the tire whereby air in the tire may pass into and out of the members.

4. A tire of the class described the inner face of the tread member of which is provided with a plurality of inwardly directed tubular members spaced circumferentially of the tire, said members being adapted to receive air under atmospheric pressure and operating as a cushioned portion for the tire, the inner ends of said members terminating adjacent to the inner face of the tire whereby air in the tire may pass into and out of said members, and whereby air may be confined in said members.

5. A tire of the class described comprising a tread portion and side portions, the tread portion being substantially circular in form in cross section and the side portions being substantially arc-shaped in form in cross section.

6. A tire of the class described comprising a tread portion and side portions, the tread portion being substantially circular in form in cross section and the side portions being substantially arc-shaped in form in cross section and being joined to the tread portion through contracted portions.

7. A tire of the class described comprising a tread portion and side portions, the tread portion being substantially circular in form in cross section and the side portions being substantially arc-shaped in form in cross section and being joined to the tread portion through contracted portions, and the inner faces of the contracted portions of the tire being substantially straight or flat.

8. A tire of the class described comprising a tread portion and side portions, the tread portion being substantially circular in form in cross section and the side portions being substantially arc-shaped in form in cross section and being joined to the tread portion through contracted portions, the inner faces of the contracted portions of the tire being substantially straight or flat, and means for reinforcing the tire.

9. A tire of the class described comprising a tread portion and side portions, the tread portion being substantially circular in form in cross section and the side portions being substantially arc-shaped in form in cross section, and the inner face of the tread portion of the tire being provided with inwardly directed tubular members spaced circumferentially of the tire.

10. A tire of the class described comprising a tread portion and side portions, the tread portion being substantially circular in form in cross section and the side portions being substantially arc-shaped in form in cross section, and the inner face of the tread portion of the tire being provided with inwardly directed tubular members spaced circumferentially of the tire, said tubular members being conical in form, the inner ends of which extend to approximately the inner face of the tire.

11. A tire of the class described comprising a tread portion and side portions, the tread portion being substantially circular in form in cross section, the side portions being substantially arc-shaped in form in cross section, and being joined to the tread portion through contracted portions, the inner faces of the contracted portions of the tire being substantially flat, and the inner face of the tread portion of the tire being provided with inwardly directed tubular members spaced circumferentially of the tire, said tubular members being conical in form and the inner ends of which extend to approximately the inner face of the tire, and the flat faces of the contracted portions of the tire being normally free from the walls of the tubular members and adapted to operate in connection therewith in the use of the tire.

In testimony that I claim the foregoing as my invention I have signed my name this 13th day of June 1922.

LOUIS TURAN.